United States Patent [19]
Cebollero

[11] Patent Number: 6,119,544
[45] Date of Patent: Sep. 19, 2000

[54] CONTROL HALF-CABLE LINKING DEVICE

[75] Inventor: Carlos Gabas Cebollero, Barcelona, Spain

[73] Assignee: Fico Cables, S.A., Barcelona, Spain

[21] Appl. No.: 09/325,618

[22] Filed: Jun. 3, 1999

Related U.S. Application Data

[63] Continuation of application No. PCT/EP97/06464, Nov. 19, 1997.

[30] Foreign Application Priority Data

Dec. 3, 1996 [ES] Spain ................................. 9602556

[51] Int. Cl.[7] .................................................. F16C 1/14
[52] U.S. Cl. .............. 74/502.4; 74/500.5; 74/501.5 R; 74/502.6
[58] Field of Search ............................ 74/502.4, 502.6, 74/500.5, 501.5 R; 403/345

[56] References Cited

U.S. PATENT DOCUMENTS

| | | | |
|---|---|---|---|
| 2,399,133 | 4/1946 | Midling . | |
| 3,298,409 | 1/1967 | Elson . | |
| 3,314,696 | 4/1967 | Ferguson et al. . | |
| 3,595,123 | 7/1971 | Wurzel | 85/8.8 |
| 4,009,896 | 3/1977 | Brewer | 285/305 |
| 4,059,295 | 11/1977 | Helm | 285/305 |
| 4,244,608 | 1/1981 | Stuemky | 285/305 |
| 4,632,434 | 12/1986 | Proctor et al. | 285/39 |
| 4,707,000 | 11/1987 | Torgardh | 285/305 |
| 4,813,716 | 3/1989 | Lalikos et al. | 285/74 |
| 4,844,650 | 7/1989 | Zapushek et al. | 403/197 |
| 4,869,534 | 9/1989 | Ketcham et al. | 285/24 |
| 4,930,932 | 6/1990 | LeVahn | 403/325 |
| 5,039,138 | 8/1991 | Dickerson | 285/314 |
| 5,209,523 | 5/1993 | Godeau | 285/93 |
| 5,211,427 | 5/1993 | Washizu | 285/23 |
| 5,518,332 | 5/1996 | Katoh | 74/502.4 |
| 5,536,103 | 7/1996 | Sawada | 74/502.4 |
| 5,556,224 | 9/1996 | Niskanen | 403/379 |
| 5,575,180 | 11/1996 | Simon | 74/502.4 |
| 5,577,415 | 11/1996 | Reasoner | 74/502.4 |
| 5,632,182 | 5/1997 | Reasoner | 74/502.4 |
| 5,653,148 | 8/1997 | Reasoner | 74/502.4 |
| 5,655,415 | 8/1997 | Nagle et al. | 74/502.4 |
| 5,662,004 | 9/1997 | Osborn et al. | 74/502.4 |
| 5,664,462 | 9/1997 | Reasoner | 74/502.4 |

FOREIGN PATENT DOCUMENTS

| | | |
|---|---|---|
| 0488844 | 6/1992 | European Pat. Off. . |
| 0 517 583 | 12/1992 | European Pat. Off. . |
| 0530778 | 3/1993 | European Pat. Off. . |
| 0593937 | 4/1994 | European Pat. Off. . |
| 1398823 | 9/1965 | France . |
| 719 512 C | 3/1945 | Germany . |
| 1063428 | 8/1959 | Germany . |
| 4310192 | 2/1994 | Germany . |
| 7151132 | 6/1995 | Japan . |

*Primary Examiner*—David A. Bucci
*Assistant Examiner*—Chong H. Kim
*Attorney, Agent, or Firm*—Renner, Otto, Boisselle & Sklar, LLP

[57] ABSTRACT

A control cable comprises first and second half cables connectable together by a linking device. The first and second half cables respectively include first and second sheaths and first and second inner cables. The linking device comprises male and female interior and exterior linking bodies respectively joined to the first and second inner cables and sheaths. The male interior and exterior linking bodies are at least partially insertable in the female interior and exterior linking bodies, respectively, and each has a groove. The interior and exterior linking bodies are locked together by respective interior and exterior locking elements. The interior locking element, in particular, includes a fixing portion for axially retaining the male interior linking body to the female interior linking body when disposed in the groove in the male interior linking body, a clamping portion spaced axially from the fixing portion for clamping around the female interior linking body, and an intermediate portion integrally joining the fixing and clamping portions.

11 Claims, 3 Drawing Sheets

CONTROL HALF-CABLE LINKING DEVICE

This is a continuation of PCT/EP97/06464, filed Nov. 19, 1997.

TECHNICAL FIELD OF THE INVENTION

The present invention relates to a device for linking two control half-cables, each of which typically consisting of an interior part and an exterior part. The interior part is usually a steel cable, whereas the external part is usually a plastic sheath. Such control (half) cables are habitually used in the automobile industry between an actuating control and its associated mechanism, like the gear lever and the gear box.

BACKGROUND OF THE INVENTION

Known in the art are a wide variety of embodiments of control cables of the type habitually used in the automobile industry, which are essentially made up of a sheathed steel cable which, uninterruptedly, links an actuating control and its associated mechanism, such as the actuating gear lever and the gear box, respectively. In general said steel cable has at either end a respective terminal for coupling the cable to said actuating control and mechanism, while the ends of the sheath are attached to respective fixed points of the vehicle structure. Moreover, the control cable frequently includes a self-adjusting device the purpose of which is to adapt initially the length of the sheathed portion of the steel control cable to the needs of each particular vehicle in this respect; if the length adjustment of said sheathed portion must be implemented permanently, for example to compensate for wear in the associated mechanism, then the control cable can be fitted with a self-adjusting device.

Quite frequently, control cables such as those described above are of considerable size, more specifically in respect of their length, which is a considerable hindrance for all those operations both in the factory and following delivery related with handling, packaging, transportation and storage. Furthermore, that considerable size of the control cable frequently hinders operations related with fitting it onto the automobile vehicle, which operations consequently call for much labor time which markedly increases the corresponding costs.

Thus, it is the object of the present invention to provide a control cable which may be easily fitted in the respective automobile and may be produced at low costs.

SUMMARY OF THE INVENTION

The above mentioned problem is solved according to the present invention in its broadest concept by two control half-cables, which may be linked by a linking device, to form the control cable.

In other words, according to the present invention, the respective two half-cables may be easily fitted in the automobile, because the their length is only about one-half of the length of the whole cable. This significantly eases the handling thereof.

More specifically, the above object is solved by a control half-cable linking device in accordance with claims 1 and 18.

Accordingly, the control half-cable linking device for linking a first and a second control half-cable in accordance with the present invention comprises:

a. a first linking body having at least one through opening;
b. a second linking body which is complementary shaped to said first linking body, to be at least partially insertable into said first linking body, said second linking body having at least one groove; and
c. a locking element with at least two appendix elements being arranged in substantially the same plane, at least one of which extending through said at least one through opening of said first linking body and engaging in said at least one groove of said second linking body to provide for a detachable connection between said first and said second linking bodies.

The linking device of the present invention may be used for linking control half-cables consisting of an interior part (typically a steel cable), and an exterior part (typically a plastic sheath). In such a case, the first and second linking bodies are provided for both, the interior and the exterior part.

Thus, the linking device of the invention preferably comprises two exterior linking bodies (a first and a second exterior linking body) which, when fixed to respective intermediate ends of the half-cable sheaths, can be coupled together by means of a locking element. The linking device of the invention preferably further comprises two interior linking bodies (a first and a second interior linking body) which, when fixed to intermediate ends of the steel cables of the half-cables, can be coupled together by means of a locking element.

According to another preferred embodiment, the interior and exterior linking bodies are so designed that, when the control half-cables are attached to an actuating control and its associated mechanism, coupling of the exterior linking bodies leads simultaneously to a coupling of the interior linking bodies.

According to another preferred embodiment of the present invention, the exterior linking bodies are of generally long cylindrical shape and are so designed that:

the first exterior linking body is attached by one of its ends, the interior end, to the intermediate end of the sheath of a control half-cable, while its other end, the exterior end, has means for fixing it to the second exterior linking body, the first exterior linking body having at least one through-orifice, through which the corresponding intermediate end of the steel cable can slide in both directions; and the second exterior linking body is attached by one of its ends, the interior end, to the intermediate end of the sheath of the other control half-cable, while its other end, the exterior end, has means for fixing it to the first exterior linking body, the second exterior linking body having an axial through-orifice through which the corresponding intermediate end of the steel cable can slide.

According to another preferred embodiment of the present invention, the interior linking bodies are of generally long cylindrical shape and are so designed that:

the first interior linking body is attached by one of its ends, the interior end, to the intermediate end of the steel cable of a control half-cable, while its other end, the exterior end, has means for fixing it to the second interior linking body; and the second interior linking body is attached by one of its ends, the interior end, to the intermediate end of the steel cable of the other control half-cable, while its other end, the exterior end, has means for fixing it to the first interior linking body.

According to another preferred embodiment of the present invention, the interior linking bodies are fitted into the axial through-orifice of a respective exterior linking body in such a way that once they are coupled together they can slide in both directions.

According to another preferred embodiment of the present invention, the interior linking body comprises:

on the first interior linking body, a cylindrical axial fixing extension with an axial fixing orifice inside it and, to the exterior, two facing transverse fixing through-openings extending through to the axial fixing orifice;

on the second interior linking body, a cylindrical axial fixing extension with a transverse perimetral or circumferentially extending fixing groove; and a fixing spring provided with two fixing arms which are mounted with a snug fit in the respective transverse fixing through-openings of the first interior linking body and traversing same, all this so designed that the coupling of the interior linking bodies is implemented when the axial fixing extension of the second interior linking body is fitted into the axial fixing orifice of the first interior linking body, this by means of double elastic deformation of the fixing spring whose fixing arms fit snugly in the transverse perimetral fixing groove of the second interior linking body.

According to another preferred embodiment, the fixing spring is substantially U-shaped and has fixing arms of circular cross-section.

According to the another preferred embodiment, the fixing spring has fixing arms are of quadrangular cross section.

According to yet another preferred embodiment of the present invention, the locking element is a fixing spring comprising a bottom which clamps the cylindrical axial fixing extension of the first interior linking body, leaving its ends at a relatively short distance from each other, with each of said ends being prolonged and having a first portion which runs longitudinally with respect to said axial extension, a second portion which links with the first and runs parallel to and facing said bottom and clamping said axial extension, a third portion which, linking with the second, runs longitudinally with respect to said axial extension, and a fourth portion which links with the third to form a corresponding fixing arm of the fixing spring.

BRIEF DESCRIPTION OF THE DRAWINGS

The figures of the drawings show preferred embodiments of the control half-cable linking device in accordance with the present invention.

DETAILED DESCRIPTION OF THE PREFERRED EMBODIMENTS

Figure 1:
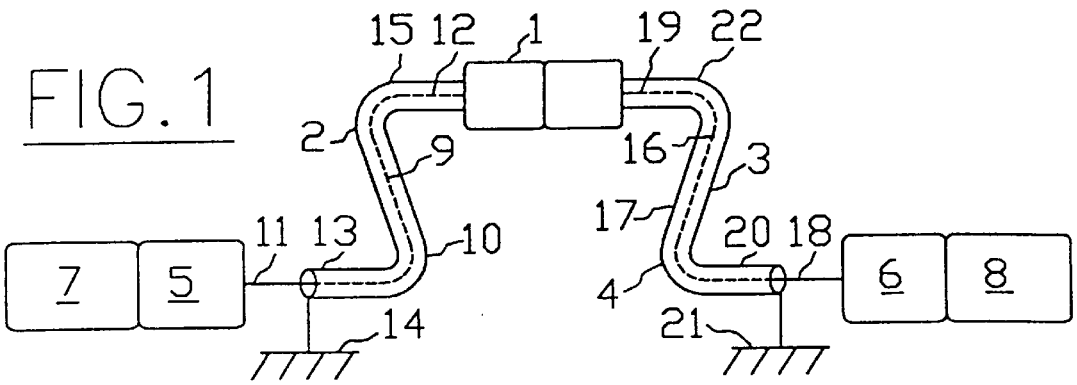
FIG. 1 is a schematic view of a control cable made up of two half-cables linked by the linking device in accordance with the present invention.

FIG. 1 shows schematically how the control half-cable linking device 1 according to a preferred embodiment of the present invention is applied for linking two control half-cables 2, 3, to form a control cable 4. The control half-cable is fitted by means of terminals 5, 6 on its ends to an actuating control 7 and its associated mechanism 8, which could for example be the actuating gear lever and the gear box of an automobile vehicle.

The first half-cable 2 comprises a steel cable 9 and a sheath 10. One of the ends of the steel cable 9, the one marked with reference number 11, is linked to a first terminal 5, while its other (or intermediate) end 12 is attached to the linking device 1 in accordance with the present invention. One of the ends of the sheath 10, the one marked with reference number 13, is attached to a fixed point 14 of the vehicle structure, while its other (or intermediate) end 15 is attached to the linking device 1.

Similarly, the second half-cable 3 comprises a steel cable 16 and a sheath 17. One of the ends of the steel cable 16, the one marked with reference number 18, is linked to a second terminal 6, while its other (or intermediate) end 19 is attached to the linking device 1 in accordance with the present invention. One of the ends of the sheath 17, the one marked with reference number 20, is attached to a fixed point 21 of the vehicle structure, while its other (or intermediate) end 22 is attached to the linking device 1.

It can be understood that the control cable 4 layout shown in detail in FIG. 1 is given solely by way of a guideline example of application of the linking device 1, since the control cable 4 can adopt any other layout without affecting the essential nature of the invention; for example, the sheath ends 13, 20 can be fixed to the terminals 5, 6, respectively. Further, the control cable 4 can include a self-adjusting or self-regulating device, not shown in FIG. 1, for adjusting the sheathed portions of steel cable 9, 16.

Figure 2:
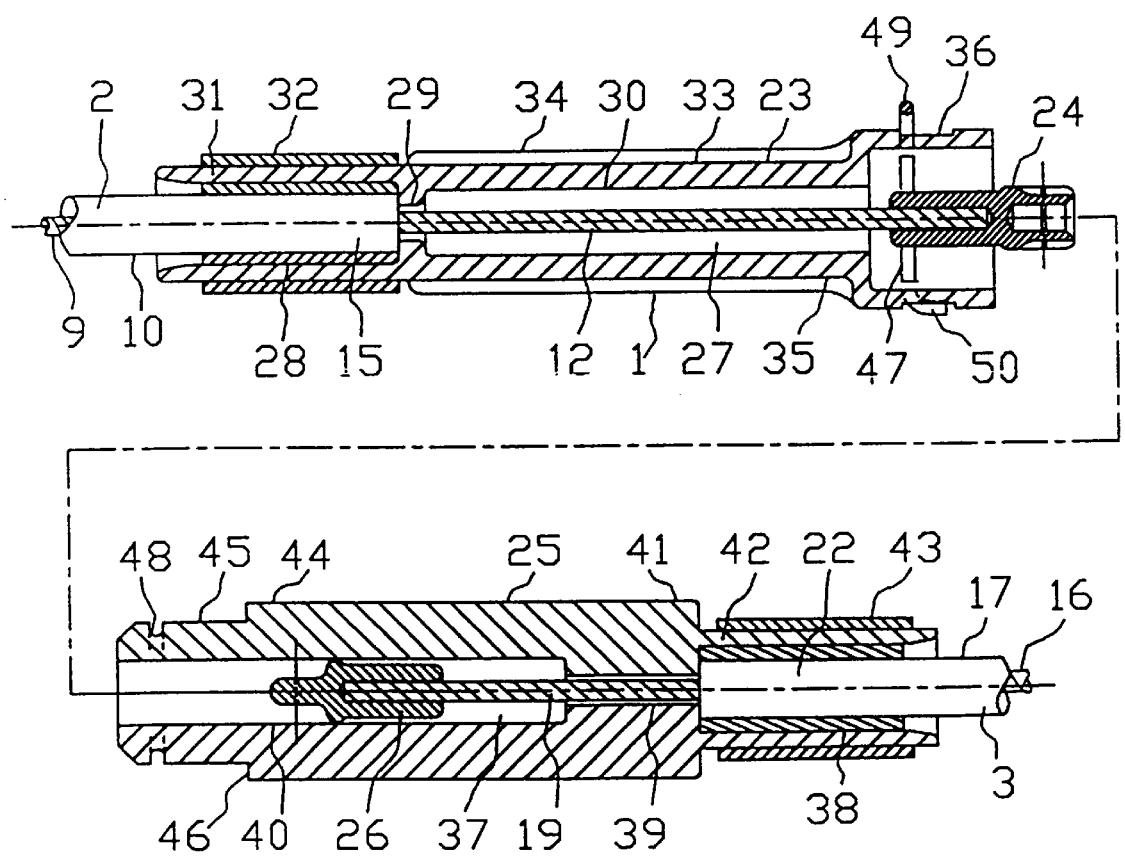
FIG. 2 is a longitudinal sectional view of the linking device of the invention with its exterior linking bodies separated.

FIG. 2 shows the linking device 1 of the invention includes a first exterior linking body 23, a first interior linking body 24, a second exterior linking body 25, a second interior linking body 26, all of these of generally cylindrical shape and coaxial to each other, with both the exterior linking bodies 23, 25 and the interior linking bodies 24, 26 being coupled together through corresponding and respective fixing means.

FIG. 2 shows that the first exterior linking body 23 has to its interior a longitudinal through-orifice 27 through which the intermediate end 12 of the steel cable 9 of the control half-cable 2 can slide in both directions. Three portions may be distinguished in said orifice 27: an interior portion 28 designed to receive with a snug fit the intermediate end 15 of the sheath 10 of the control half-cable 2, a central portion 29, and an exterior portion 30.

To the exterior, the first exterior linking body 23 has on its interior end 31 a sleeve 32 which by compression ensures fixing of the intermediate end 15 of the sheath 10, at its central portion 33 a plurality of ribs 34, and on its exterior end 35 a tubular fixing extension 36.

FIG. 2 further shows how the second exterior linking body 25 has a longitudinal through-orifice 37 through which the intermediate end 19 of the steel cable 16 of the control half-cable 3 can slide in both directions. Also here, three portions may be distinguished in said orifice 37: an interior portion 38 designed to receive with a snug fit the intermediate end 22 of the sheath 17 of the control half-cable 3, a central portion 39, and an exterior portion 40 on which the second interior linking body 26 is mounted to be slidably in both axial directions.

To the exterior, the second exterior linking body 25 has on its interior end 41 a portion of smaller diameter on which a sleeve 43 is fitted, which by compression ensures fixing of the intermediate end 22 of the sheath 17. On its exterior end 44, a cylindrical fixing extension 45 which forms a fixing step 46, said cylindrical fixing extension 45 being designed to be housed with a snug fit in the tubular fixing extension 36 of the first exterior linking body 23.

FIG. 2 further shows by which means, according to the present invention, the exterior linking bodies 23, 25, are preferably detachably connected, when they are coupled:

Initially, there are on the tubular fixing extension 36 of the first exterior linking body 23 two facing transverse through-openings 47.

Further, there is on the cylindrical fixing extension 45 of the second exterior linking body 25 a circumferentially extending fixing groove 48.

Finally, there is a locking element in the form of a generally U-shaped fixing spring 49 with fixing arms 50 (cf. FIG. 10).

The above elements are designed such that, when the exterior linking bodies 23, 25 are coupled, the fixing arms 50 of the fixing spring 49 traverse the facing transverse through-openings 47 of the first exterior linking body 23 until they snap into the circumferentially extending fixing groove 48 of the second exterior linking body 25.

It can be understood that fixing of the coupling of both bodies 23, 25 can be implemented through any other suitable means without this affecting the essential nature of the invention: for example, corresponding fixing lugs and openings, not shown, could be provided on the cylindrical fixing extension 45 and on the tubular fixing extension 36, respectively.

Figure 3:
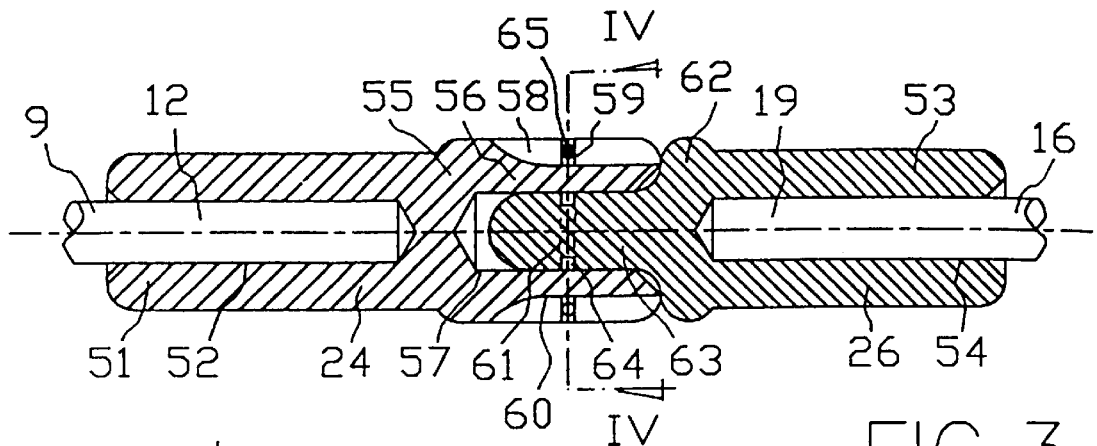
FIG. 3 is an enlarged longitudinal sectional view of the interior linking bodies and the locking element according to a first preferred embodiment.

FIG. 3 shows as a preferred embodiment in enlarged form how the first interior linking body 24 has on its interior end 51 an axial orifice 52 designed to receive the intermediate end 12 of the steel cable 9 of the control half-cable 2 with a snug fit, to fix it. Similarly, the second interior linking body 26 has at its interior end an axial orifice 54 designed to receive the intermediate end 19 of the steel cable 16 of the control half-cable 3 with a snug fit, to fix it.

Figure 4:
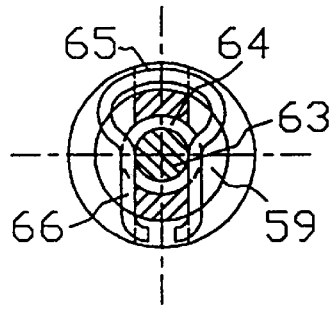
FIG. 4 is a view taken along the section IV—IV of FIG. 3.

FIGS. 3,4 show by which means, according to the present invention, the interior linking bodies 24, 26 are preferably detachably connected, when they are coupled:

On the exterior end 55 of the first interior linking body 24, a cylindrical fixing extension 56 is provided, comprising an axial fixing orifice 57, two longitudinal grooves 58 diametrically opposite to each other, two transverse fixing through-openings 59 facing each other, which link the bottoms 60 of the longitudinal grooves 58 and form respective passage openings 61, shown by means of broken lines in FIG. 3, to the axial fixing orifice 57.

On the exterior end 62 of the second interior linking body 26, a cylindrical (axial) fixing extension 63 provided with a circumferentially extending (perimetral) transverse fixing groove 64.

A fixing spring 65 of generally U-shaped circular cross section having two fixing arms 66, both of which being mounted with a snug fit in the respective transverse fixing through-openings 59 of the first interior linking body 24 to traverse them. The fixing spring 65 is so designed that, once both interior linking bodies 24, 26 have been coupled, its fixing arms 66 are fitted into the transverse fixing groove 64 of the second interior linking body 26.

Figure 5:
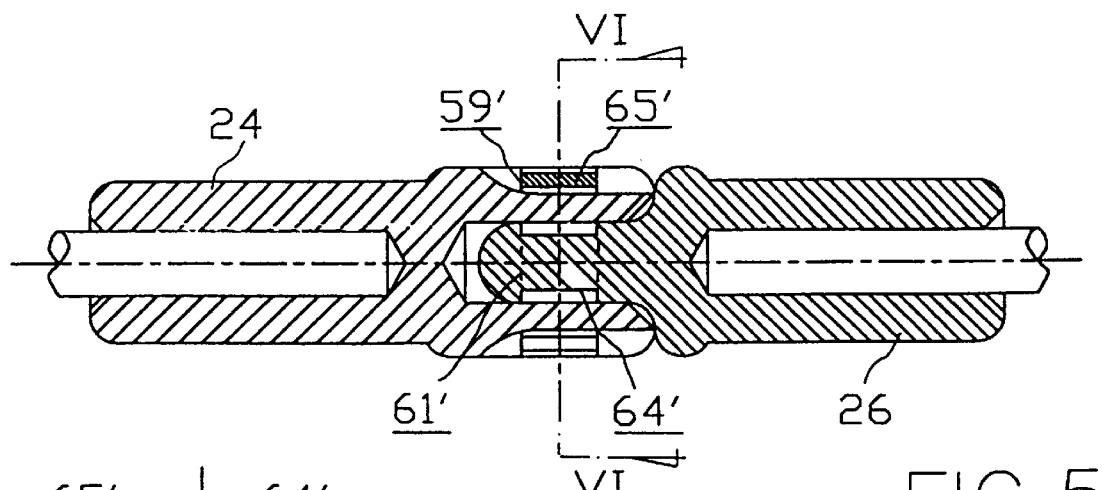
FIG. 5 an enlarged longitudinal sectional view of the interior linking bodies and the locking element according to a second preferred embodiment.
Figure 6:
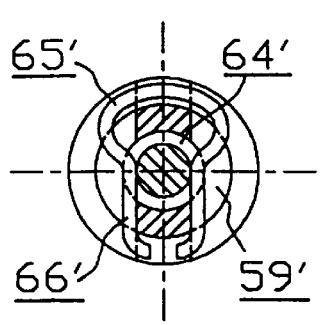
FIG. 6 is a view taken along the section VI—VI of FIG. 5.

FIGS. 5 and 6 show another preferred embodiment of the locking element in accordance with the present invention. The locking element in accordance with this preferred embodiment differs from the above described in that the generally U-shaped fixing spring, marked with reference number 65', has a quadrangular cross section and both its fixing arms 66' are mounted with a snug fit in respective transverse fixing trough-holes 59' of the first interior linking body 24, shown by means of broken lines in FIG. 5. The U-shaped fixing spring 65' is designed in such a way that, once both interior linking bodies 24, 26 have been coupled, the fixing arms 66' snap in a transverse fixing groove 64' of the second interior linking body 26. For the purposes of greater clarity, the remaining reference numbers have been omitted from said FIGS. 5 and 6.

Figure 7:
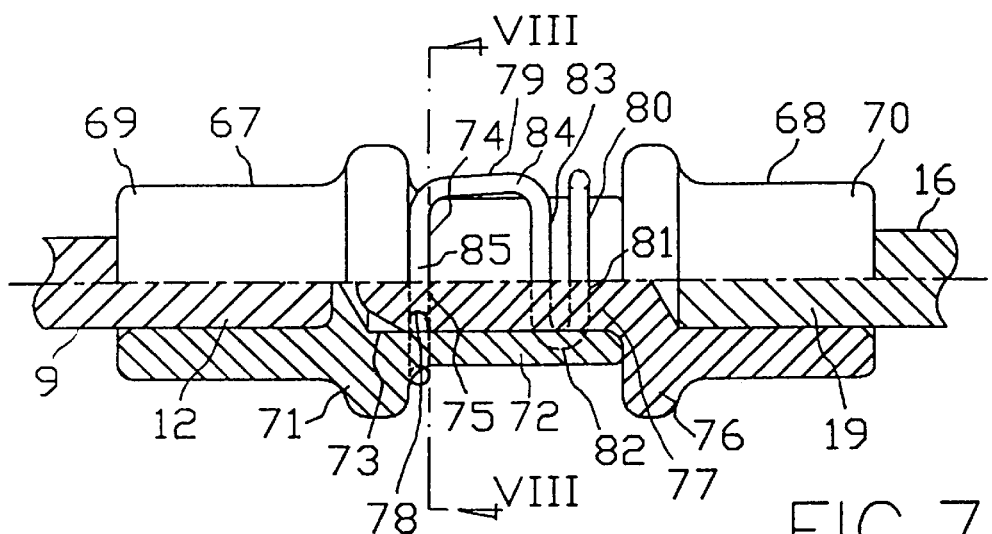
FIG. 7 is a longitudinal sectional view of another preferred embodiment of the interior linking bodies and their locking element.
Figure 8:
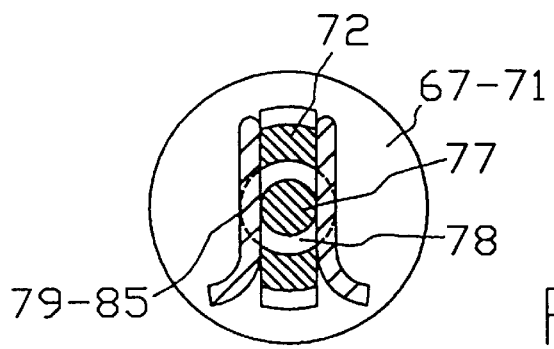
FIG. 8 is a view taken along the section VIII—VIII of FIG. 7.
Figure 9:
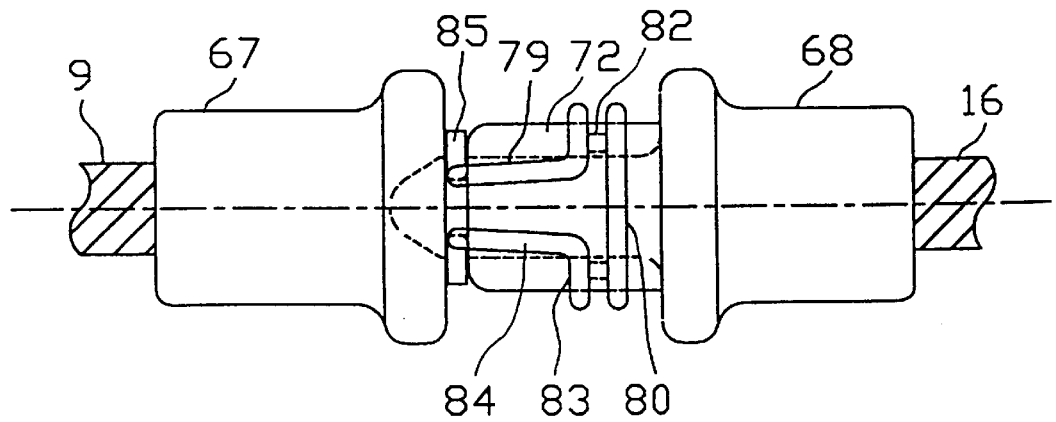
FIG. 9 is a side view of the interior linking bodies and their locking element shown in FIGS. 7,8.

FIGS. 7, 8 and 9 show another preferred embodiment of the first and second interior linking bodies 67 and 68, respectively, which are of slightly different shape than the first and second interior linking bodies 24, 26 shown in FIGS. 2 to 6, but do not differ in any way from the latter in respect of functioning and fitting inside the exterior linking bodies 23, 25 shown in FIG. 2.

Thus, the first interior linking body 67 is attached by its interior end 69 to the intermediate end 12 of the steel cable 9 of the control half-cable 2, while the second interior linking body 68 is attached by its interior end 70 to the intermediate end 19 of the steel cable 16 of the control half-cable 3.

FIGS. 7,8, and 9 show by which means, according to the present invention, the interior linking bodies 67, 68 are preferably detachably connected, when they are coupled:

On the exterior end 71 of the first interior linking body 67, a cylindrical (axial) fixing extension 72 is provided, on which there is an axial fixing orifice 73, and two transverse fixing trough-openings 74, shown by broken lines in FIG. 7, facing each other and forming respective openings 75 to the axial fixing orifice 73.

On the exterior end 76 of the second interior linking body 68, a cylindrical (axial) fixing extension 77 is provided, having a circumferentially extending fixing groove 78.

A fixing spring 79 which, as shown in FIGS. 7 and 9, has a bottom 80 clamping the cylindrical fixing extension 72 of the first interior linking body 67, which bottom 80 has its ends 81 situated at a relatively short distance from each other. The fixing spring 79 further comprises a first portion 82 of relatively short length which runs longitudinally with respect to the axial extension 72, a second portion 83 which runs parallel to and facing said bottom 80, a third portion 84 which runs longitudinally or parallel with respect to the axial extension 72, and a fourth portion consisting of transverse fixing arms 85, which are housed with a snug fit in the respective transverse fixing trough-openings 74 and traverse the openings 75 of the first interior linking body 67.

The fixing spring 79 is so designed that, once both interior linking bodies 67, 68 have been coupled, the fixing arms 85 snap into the circumferentially extending fixing groove 78 of the second interior linking body 68.

In the following, a description of the functioning of the control half-cables linking device of the invention is provided with reference to the example of embodiment shown in FIGS. 2, 3 and 4 (having in mind that the preferred embodiment shown in FIGS. 5 and 6, and the preferred embodiment of the interior linking bodies 67, 68 and their fixing means shown in FIGS. 7, 8 and 9 do not differ in functioning from that shown in FIGS. 2, 3 and 4). The following description of functioning refers to the control cable 4 schema of FIG. 1.

With the terminals 5, 6 of the control cable 4 attached to the actuating control 7 and to its associated mechanism 8 respectively, and the ends 13, 20 of the sheaths 10, 17 of the control half-cables 2, 3 attached to corresponding fixed points 14, 21 of the vehicle structure, as shown schematically in FIG. 1, both the actuating control 7 and the associated mechanism 8 are in corresponding working positions. Under these conditions, in order to link the control half-cables 2, 3 the user simply has to proceed as follows:

Initially, the exterior linking bodies 23, 25 are grasped and the cylindrical axial fixing extension 45 of the second exterior linking body 25 is inserted in the tubular fixing extension 36 of the first exterior linking body 23. If the exterior linking bodies are coupled together, with the step 46 of the second exterior linking body 25 acting as a stop, the following happens:

A double elastic deformation of the fixing spring 49 occurs, since both fixing arms 50 snap into the transverse fixing groove 48 of the cylindrical axial fixing extension 45 of the second exterior linking body 25, locking both exterior linking bodies 23, 25 to each other.

Simultaneously and automatically, with the first interior linking body 24 resting with a snug fit in the exterior portion 40 of the through-orifice 37 of the second exterior linking body 25, the coupling of the interior linking bodies 24, 26 is implemented as shown in FIGS. 3 and 4, by insertion of the cylindrical axial fixing extension 63 of the second interior linking body 26 into the axial fixing orifice 57 of the first interior linking body 24. This insertion of the cylindrical axial fixing extension 63 causes a double elastic deformation of the fixing spring 65, both arms 66 of which snap into the circumferentially extending fixing groove 64, as shown in FIG. 4.

It should be noted that during the automatic coupling of the interior linking bodies 24, 26, the above-described attachment of the terminals 5, 6 to the actuating control 7 and to its associated mechanism 8, respectively, prevents the steel cables 9, 16 of the control half-cables 2, 3 (whose intermediate ends 12, 19 are attached to the interior linking bodies 24, 26) from withdrawal and thus preventing the coupling.

Once the coupling of the exterior linking bodies 23, 25 and of the interior linking bodies 24, 26 has been implemented in the manner described above, both the sheaths 10, 17 and the steel cables 9, 16 of the control half-cables 2, 3 respectively are linked in such a way that the interior linking bodies 24, 26 driven by the steel cables 9, 16 can slide with a snug fit in both directions through the through-orifices 27, 37 of the exterior linking bodies 23, 25.

In the event that both half-cables 2, 3 have to be separated, for example during a maintenance operation on the automobile vehicle, the user has simply first to release the exterior linking bodies 23, 25 by taking the fixing spring 49 out of the fixing groove 48 of the second exterior retaining body 25, then separating both exterior linking bodies 23, 25 and then separating both interior linking bodies 24, 26 by withdrawing the fixing arms 66 of the fixing spring 65 by double elastic deformation of the transverse fixing groove 64 of the second interior linking body 26, leaving the linking device of the invention in the initial position described above.

The half-cable linking device shown in FIGS. 2, 3 and 4, can be fitted with a self-adjusting device comprising: a tubular body coaxially mounted with respect to the second exterior linking body, and able to slide in both directions, the tubular body being linked by its interior end to the intermediate end of the sheath of the half-cable; a thrust spring; and a retaining means which include, on the tubular body and the second interior linking body, respective retaining screw-threads; and finally a fixing nut.

The functioning of this example of application of the linking device of the invention does not in any way depart from the one described above; it can be understood that, once both half-cables 2, 3 have been coupled together by means of the linking device of the present invention in the way explained above, the self-adjusting device has the function of adapting the length of the sheathed portions 10, 17 to that of the steel cable 9, 16, to the needs in this respect presented by each particular vehicle.

What is claimed is:

1. A cable assemblage comprising first and second half cables connectable together by a linking device, the first and second half cables respectively including first and second sheaths which are connectable to each other by the linking device and first and second inner cables that are connectable together by the linking device, wherein the linking device comprises:

male and female interior linking bodies respectively joined to the first and second inner cables, the male interior linking body being at least partially insertable in the female interior linking body and having a groove; and an interior locking element including a fixing portion axially retaining the male interior linking body to the female interior linking body when disposed in the groove in the male interior linking body, a clamping portion spaced axially from the fixing portion for clamping around the female interior linking body where the clamping portion is assembled to the female interior linking body, and an intermediate portion integrally joining the fixing and clamping portions.

2. The cable assemblage of claim 1, wherein the female interior linking body has at least one through opening through which the fixing portion is inserted for engagement with the groove in the male interior linking body.

3. The cable assemblage of claim 2, wherein the female interior linking body has a tubular fixing extension including the at least one through opening.

4. The cable assemblage of claim 3, wherein the tubular fixing extension includes a pair of the through openings at diametrically opposite sides of the tubular fixing extension, and the fixing portion of the interior linking element includes a pair of laterally spaced apart fixing arms that respectively pass through the through openings for engaging in the groove in the male interior linking body.

5. The cable assemblage of claim 4, wherein the intermediate portion includes a pair of axially extending portions by which the fixing arms are joined to the clamping portion respectively and independently of one another.

6. The cable assemblage of claim 4, wherein the male interior linking body has a fixing extension about which the groove extends circumferentially.

7. The cable assemblage of claim 1, wherein the interior locking element is made of a single wire.

8. The cable assemblage of claim 1, wherein the linking device further comprises male and female exterior linking bodies, one joined to the first sheath and the other joined to the other second sheaths, the male exterior linking body being at least partially insertable in the female exterior linking body and having a groove; and an exterior locking element insertable into the groove to hold the male and female linking bodies together.

9. A control cable comprising a first and a second outer sheath connectable to each other, and a first and a second inner steel half-cable, which can be connected to each other by means of a linking device, the first outer sheath and the first inner steel cable forming a first control half cable, the second outer sheath and the second inner steel cable forming a second control half cable, wherein said linking device comprises:

a. a first interior linking body having at least one through opening and a hollow cylindrical fixing extension;
  b. a second interior linking body, which is complementary shaped to said first interior linking body, to be at least partially insertable into said first linking body, said second interior linking body having a circumferentially extending groove;
  c. an interior locking element with a circular cross section and at least two appendix elements being arranged in substantially the same plane, at least one of which extending through said at least one through opening of said first interior linking body and tangentially engaging in said circumferential groove of said second interior linking body to provide for a detachable connection between said first and said second interior linking bodies;

wherein said interior locking element has a circular cross section and further comprises:

two transversely extending bottoms with ends situated at a relatively short distance from each other, which clamp said hollow cylindrical fixing extension of said first linking body;
  two first curved portions of relatively short length which run axially with respect to said hollow cylindrical fixing extension;
  two second portions running parallel to and facing said bottoms; and
  two third portions running axially with respect to said hollow cylindrical fixing extension; and
  two fourth portions running parallel to said bottoms and forming said at least two appendix elements.

10. The control cable of claim 9, wherein said interior locking element is made of a single wire.

11. The control cable of claim 9, wherein said first and second outer sheaths are configured to connect simultaneously with the connecting of said interior linking bodies.

* * * * *